United States Patent
Fujii et al.

(10) Patent No.: US 7,158,368 B2
(45) Date of Patent: *Jan. 2, 2007

(54) PROCESS FOR PRODUCING SOLID ELECTROLYTIC CAPACITOR AND SOLID ELECTROLYTIC CAPACITOR

(75) Inventors: Eizo Fujii, Hirakata (JP); Hideki Ishida, Takasago (JP)

(73) Assignees: Sanyo Electric Co., Ltd., Moriguchi (JP); Sanyo Electronic Components Co, Ltd., Daito (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/365,834

(22) Filed: Mar. 2, 2006

(65) Prior Publication Data

US 2006/0146482 A1 Jul. 6, 2006

Related U.S. Application Data

(62) Division of application No. 11/075,729, filed on Mar. 10, 2005, which is a division of application No. 10/659,717, filed on Sep. 11, 2003, now Pat. No. 6,891,717.

(30) Foreign Application Priority Data

Sep. 12, 2002 (JP) .............................. 2002-266465

(51) Int. Cl.
*H01G 4/228* (2006.01)
*H01G 9/10* (2006.01)

(52) U.S. Cl. ..................... 361/540; 361/538; 361/528

(58) Field of Classification Search ............... 361/523, 361/516–517, 519, 525, 528–529, 532–533, 361/535–540

See application file for complete search history.

(56) References Cited

U.S. PATENT DOCUMENTS

| 5,716,420 | A | 2/1998 | Kuriyama | 29/25.03 |
| 5,781,401 | A | 7/1998 | Tomiyasu et al. | 361/303 |
| 6,625,009 | B1 | 9/2003 | Maeda | 361/528 |
| 6,751,086 | B1 | 6/2004 | Matsumoto | 361/523 |
| 6,891,717 | B1 * | 5/2005 | Fujii et al. | 361/523 |

FOREIGN PATENT DOCUMENTS

JP  2001-044077  2/2001

* cited by examiner

*Primary Examiner*—Eric W. Thomas
(74) *Attorney, Agent, or Firm*—Armstrong, Kratz, Quintos, Hanson & Brooks, LLP

(57) ABSTRACT

The invention provides a process for fabricating a solid electrolytic capacitor of the chip type which process includes the steps of plating a fabrication frame comprising an anode terminal member and a cathode terminal member projecting from a pair of side frame members respectively so as to be opposed to each other, the anode terminal member being stepped so as to provide a lower portion toward the cathode terminal member, a hole extending vertically and being formed in each of the anode terminal member and a higher portion of the cathode terminal member, joining an anode lead of a capacitor element to an upper surface of the cathode terminal member and a bottom surface of the capacitor element to an upper surface of the lower portion of the cathode terminal member, forming a packaging resin portion around the capacitor element without permitting resin to ingress into the holes, and cutting the anode and cathode terminal members along vertical planes extending through the respective holes.

16 Claims, 8 Drawing Sheets

PROCESS FOR PRODUCING SOLID ELECTROLYTIC CAPACITOR AND SOLID ELECTROLYTIC CAPACITOR

CROSS-REFERENCE TO RELATED APPLICATION

This application is a divisional application of U.S. Ser. No. 11/075,729, filed Mar. 10, 2005 (which is a divisional application of U.S. Ser. No. 10/659,717, filed Sep. 11, 2003, now U.S. Pat. No. 6,891,717), the entire contents of which are incorporated herein by reference.

FIELD OF THE INVENTION

The present invention relates to a process for fabricating a solid electrolytic capacitor comprising a capacitor element packaged with a resin layer, and the solid electrolytic capacitor produced by this process.

BACKGROUND ART

Solid electrolytic capacitors of the chip type comprise a capacitor element including a sintered block which has one end of an anode lead embedded therein and which is provided with an insulating layer, electrolyte layer and cathode layer formed over the surface of the block. Common chip-type solid electrolytic capacitors are fabricated by joining a terminal in the form of a thin plate to each of the anode lead and the cathode layer, forming a packaging resin portion around the capacitor element by resin molding and thereafter bending the terminals so as to position the outer ends of the terminals beneath the bottom of the resin portion. However, with a growing demand for compacted chip-type solid electrolytic capacitors of lower ESR, capacitors of such type encounter structural limitations.

JP-A No. 2001-44077 discloses a chip-type solid electrolytic capacitor which is contrived to ensure further compactness and still lower ESR. The disclosed capacitor has an anode terminal extending downward from an anode lead, and a cathode terminal is joined to the bottom surface of a capacitor element (and also to a side surface thereof). Since this type of capacitor has no terminals extending sideways therefrom unlike the conventional solid electrolytic capacitor, the capacitor is compacted, while the capacitor is reduced in ESR because the terminals are shortened.

With reference to FIGS. 9A to 9D, a brief description will be given of a process for fabricating the solid electrolytic capacitor disclosed in JP-A No. 2001-44077. First as shown in FIG. 9A, a plated L-shaped cathode terminal 36 is bonded with an electrically conductive adhesive to a capacitor element 31 having an anode lead 32 secured to a metal ribbon 7. The outer surface of the cathode terminal 36 is masked with an insulator 36a so as not to permit resin to adhere thereto when a packaging resin portion 34 is formed. Next as shown in FIG. 9B, the packaging resin portion 34 for covering the capacitor element 31 is formed thereover by a powder coating machine. The resin portion 34 is so formed as not to cover the outer surface of the cathode terminal 36. As seen in FIG. 9C, the insulator 36a is then removed from the outer surface of the cathode terminal 36. Finally as shown in FIG. 9D, a plated L-shaped anode terminal 35 is joined to the anode lead 32 and to the resin portion 34, and the anode lead 32 is cut to separate the resulting solid electrolytic capacitor from the metal ribbon 7.

The capacitor fabricating process described above is cumbersome because the process includes the step of masking the cathode terminal 35 with the insulator 36a and the step of removing the insulator 36a after the packaging resin portion 34 has been formed. Furthermore, the packaging resin portion 34 can be formed more easily by resin molding as generally practiced in the prior art than by using the powder coating machine. Accordingly, it is desired to fabricate with ease solid electrolytic capacitors of such type that no electrode terminals extend outward and are bent, by a process similar to the prior-art process.

Nevertheless, the following problem is encountered in the case where solid electrolytic capacitors of the type mentioned are fabricated by a process similar to the conventional process. As shown in FIG. 10A, for example, a fabrication frame 1 for use in the process has arranged longitudinally thereof opposed pairs of anode terminal members 12 and cathode terminal members 13 which project inward. The fabrication frame 1 is plated to form a plating layer 23 over the surface thereof, anode leads 32 of capacitor elements 31 are thereafter joined to the respective anode terminal members 12, and the capacitor elements 31 are joined at their bottom surfaces to the respective cathode terminal members 13. A packaging resin portion 34 for covering each of the capacitor elements 31 is formed by resin molding as shown in FIG. 10B.

The anode terminal members 12 and the cathode terminal members 13 are then cut to separate the resulting solid electrolytic capacitors 3 from the fabrication frame 1 as shown in FIG. 10C. The capacitor thus obtained has cut surfaces, i.e., side portions of the anode terminal 35 and the cathode terminal 36, which are not covered with the plating layer 23 (which is formed only at edges of the side portions), so that these side portions must be plated after the cutting step. The reason is that major areas of side surfaces of the anode terminal 35 and the cathode terminal 36 to which solder adheres when the capacitor is mounted on a board need to be covered with a plating layer so as to ensure an enhanced bond strength. However, performing the plating step twice in fabricating the solid electrolytic capacitor is inefficient, while plating the capacitors individually after the separating step is extremely cumbersome. It is therefore desired that the plating step to be performed during the fabrication of solid electrolytic capacitor be limited to that for the fabrication frame 1.

The present invention has overcome the above problem and provides a process for fabricating a solid electrolytic capacitor of the type having no electrode terminals extending outward and bent which process includes a simplified plating step. The invention further provides the capacitor which is fabricated by this process and which can be soldered to a board rapidly with safety.

SUMMARY OF THE INVENTION

The present invention provides a process for fabricating a solid electrolytic capacitor including the steps of: plating a fabrication frame comprising an anode terminal member projecting from one of a pair of parallel side frame members, and a cathode terminal member projecting from the other side frame member so as to be opposed to the anode terminal member, the cathode terminal member being stepped to provide a lower portion toward an inner end thereof, a hole being formed in each of the anode terminal member and a higher portion of the cathode terminal member; joining an anode lead of a capacitor element to an upper surface of the anode terminal member of the plated fabrication frame and joining a bottom surface of the capacitor element to an upper surface of the lower portion of the cathode terminal member;

forming a packaging resin portion around the capacitor element except at the holes; and cutting the fabrication frame along a first vertical plane through the hole formed in the anode terminal member and along a second vertical plane through the hole formed in the cathode terminal member to obtain a solid electrolytic capacitor as separated from the side frame members; a plating layer being formed by the step of plating the fabrication frame on the anode and cathode terminal members in regions thereof at least inwardly of the first and second vertical planes.

The invention provides another process for fabricating a solid electrolytic capacitor wherein a cavity which is opened downward is formed in each of the anode terminal member and the higher portion of the cathode terminal member in place of the hole.

The invention provides a solid electrolytic capacitor comprising a capacitor element having a sintered block and an anode lead projecting from the sintered block, an anode terminal approximately rectangular parallelepipedal and joined to the anode lead, a generally L-shaped cathode terminal joined to the sintered block and a packaging resin portion covering the capacitor element, the anode terminal being perpendicular to the anode lead and exposed from the packaging resin portion at a bottom surface of the resin portion and a first side surface thereof continuous with the bottom surface, the cathode terminal being provided along a surface of the sintered block and exposed from the packaging resin portion at the bottom surface and a second side surface perpendicular to the bottom surface and opposite to the first side surface, a side portion of the anode terminal exposed from the first side surface and a side portion of the cathode terminal exposed from the second side surface being each covered with a plating layer over a surface thereof and each provided with a recess opened at least downward.

The process of the present invention for fabricating a solid electrolytic capacitor uses a fabrication frame comprising an anode terminal member and a cathode terminal member each having a hole or cavity formed therein. The fabrication frame is plated, a capacitor element is joined to the frame, a packaging resin portion is formed around the capacitor element, and the fabrication frame, i.e., the anode and cathode terminal members, are cut along vertical planes extending through the respective holes or cavities, whereby a solid electrolytic capacitor is separated from the fabrication frame.

When the anode terminal member and the cathode terminal member are cut, the inner end portions of the members separated from the frame provide an anode terminal and a cathode terminal for the capacitor. The plating step forms a plating layer in regions at least inwardly of the vertical planes, and the anode terminal member and the cathode terminal member are cut along the vertical planes through the respective holes or cavities, so that the inner surfaces of the terminal members defining the holes or cavities and providing side portion of the anode terminal and the cathode terminal are covered with the plating layer. This obviates the need to plate the terminals after the capacitor is cut off from the fabrication frame. Thus, the solid electrolytic capacitor of the chip type having no electrodes extending outward and bent can be fabricated by a process which is similar to the conventional process for producing solid electrolytic capacitors. Since the packaging resin portion is formed without permitting the resin to ingress into the holes or cavities and therefore leaving the holes or cavities, there is no need to protect the terminal regions as with an insulating layer, with the result that the capacitor can be obtained when the anode terminal member and the cathode terminal member are cut.

The present invention provides a solid electrolytic capacitor which is fabricated by the above process and in which a recess is formed in a side portion of each of the anode terminal and the cathode terminal. Since the recesses are open at least downward, the solder used for mounting the capacitor on a board forms heaps as joined to the bottom surfaces of the recesses. A plating layer is formed on the bottom surfaces of the recesses and therefore serves to mount the capacitor on the board with a high strength. The flow of the solder as melted for soldering is restrained by the recesses, which accordingly prevent the molten solder from flowing onto the packaging resin portion. Consequently, the solid electrolytic capacitor can be mounted on the board promptly with safety without the necessity of paying attention to an outflow of the solder.

DETAILED DESCRIPTION OF THE INVENTION

Figure 1A:
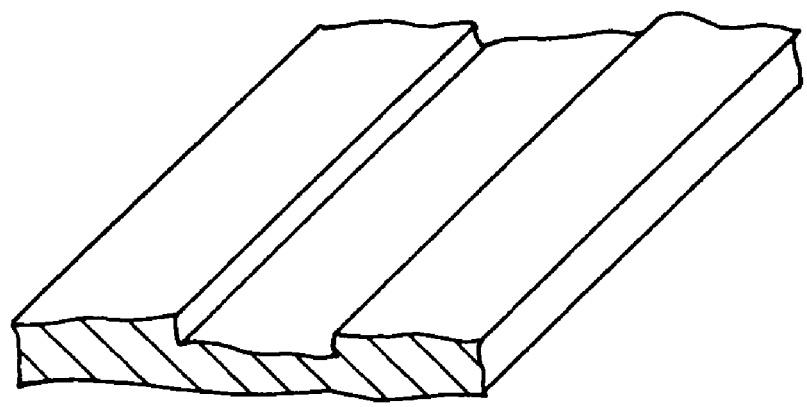
FIGS. 1A and 1B are perspective views showing steps of making a fabrication frame according to a first embodiment of the invention.

With reference to the drawings concerned, a description will be given of a first embodiment of the invention, i.e., a process for fabricating a chip-type solid electrolytic capacitor. Throughout the drawings, like parts will be designated by like reference numerals.

Steps of making a fabrication frame 1 will be described with reference to FIGS. 1A and 1B.

Figure 1B:
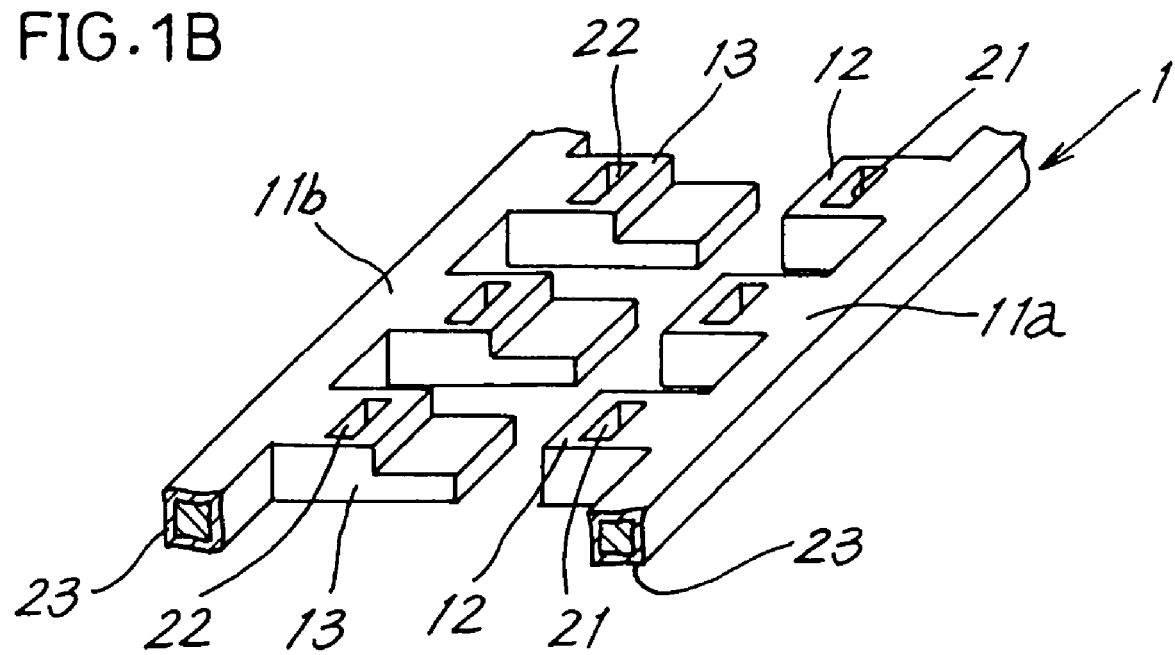

First as shown in FIG. 1A, a strip-like recessed portion is formed approximately in the center of upper surface of a metal thin plate (e.g., a copper plate having a thickness of about 0.3 mm) longitudinally thereof. The drawing shows only a portion of the thin plate. Next, a fabrication frame 1 shown in FIG. 1B is made from the thin plate by press work (blanking). The fabrication frame 1 has a pair of side frame members 11a, 11b extending longitudinally thereof. Anode terminal members 12 project inward from the side frame member 11a, and cathode terminal members 13 project inward from the other side frame member 11b so as to be opposed to the respective anode terminal members 12. Thus, pairs of terminal members 12, 13 are arranged longitudinally of the fabrication frame 1. Along the longitudinal direction of the frame 1, the cathode terminal members 13 have approximately the same width as the anode terminal members 12. FIG. 1B partly shows the fabrication frame 1. At opposite ends of the frame not shown in this drawing, the side frame members 11a, 11b are interconnected. The connection between the side frame members 11a, 11b is not limited to each of opposite ends but may be provided at any location between the pairs of the terminal members 12, 13.

Each of the anode terminal members 12 is rectangular parallelepipedal and has a hole 21 vertically extending through a portion of the member 12 in the vicinity of the inner end thereof. Each of the cathode terminal members 13 is stepped to provide a difference in thickness with respect to the vertical direction, and the portion of the member 13 toward the inner end thereof is a lower portion corresponding to the above-mentioned recessed portion. The member 13 has a hole 22 extending vertically through the higher portion thereof and positioned close to the lower portion. With the present embodiment, these holes 21, 22 are rectangular holes.

When made, the fabrication frame 1 is electrolytically plated to form a plating layer 23 over the surface thereof. According to the present embodiment, the plating layer 23 is formed over the approximately entire surface of the frame 1. (The plating layer 23 is not formed, for example, at portions with which the members for supporting the frame 1 are in contact during plating.) The plating layer 23 comprises, for example, Ni/Pd/Au. To obtain the advantage of the present invention, the plating layer 23 is formed on the anode terminal member 12 and the cathode terminal member 13 in regions at least inwardly of the respective vertical planes (A—A and B—B to be mentioned later) along which the members 12, 13 are cut.

Figure 2A:
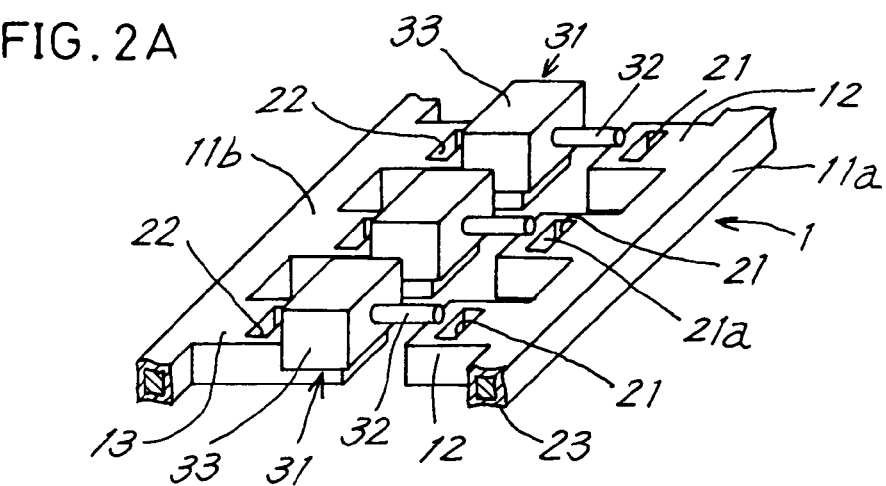
FIGS. 2A to 2C are perspective views showing steps according to the first embodiment of the invention.

With reference to FIG. 2A, capacitor elements 31 are joined to the fabrication frame 1 after the frame 1 is electrolytically plated. The capacitor element 31 is made basically from a sintered block 33 of a valve metal such as tantalum. The block 33 has an anode lead 32 embedded therein and projecting from the surface thereof. Although not shown, a dielectric oxide coating is formed by anodic oxidation over the surface of the block 33. A solid electrolyte layer of an electrically conductive high polymer such as polypyrrole is formed on the dielectric oxide coating by electrolytic polymerization or chemical polymerization. A cathode layer comprising a carbon layer and a silver layer is formed on the electrolyte layer.

The outer end of the anode lead 32 is joined to the upper surface of inner end of the anode terminal member 12 as by electric welding. The outer end face of the anode lead 32 is positioned preferably inwardly of the inner surface 21a of the member 12 defining the hole 21 which surface is positioned toward the lead 32. The bottom surface of the sintered block 33 and the side surface thereof opposite to the lead 32 are joined respectively to the upper surface of the lower portion of the anode terminal member 12 and a vertical face interconnecting the upper surface of the lower portion and the upper surface of the higher portion. An electrically conductive adhesive is used for joining the block 33 to the fabrication block 1.

Figure 3:
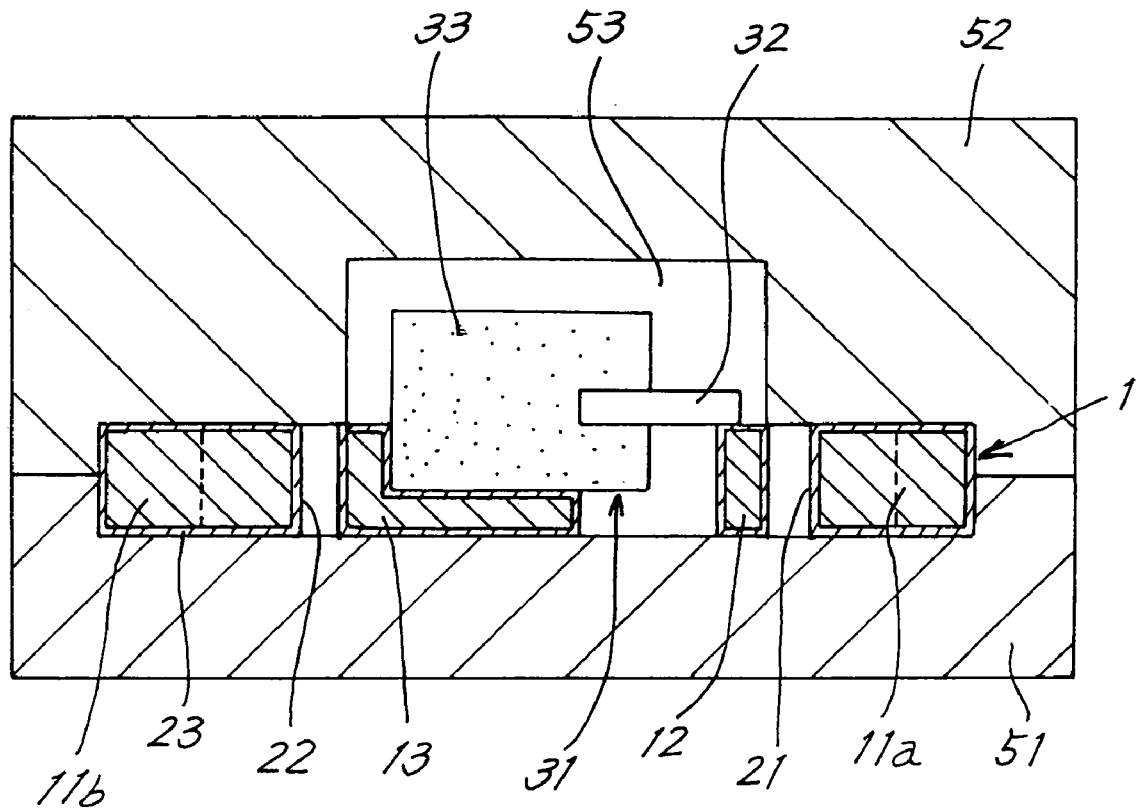
FIG. 3 is a view in vertical section of a capacitor element and members therearound for showing how to make a packaging resin portion according to the first embodiment.

A packaging resin portion 34 is then formed around each of the capacitor element 31 joined to the fabrication frame 1 by resin molding. FIG. 3 is a view in vertical section of the capacitor element 31 and members therearound for showing how to form the packaging resin portion 34 by transfer molding. An inside space 53 is formed around the capacitor element 31 by placing the fabrication frame 1 on a lower mold 51 with the capacitor element 31 joined to the frame 1 and placing an upper mold 52 on the lower mold 51. Molten epoxy resin is poured into the inside space 53 and cured, whereby a packaging resin portion 34 is formed for covering the capacitor element 31. The molds 51, 52 are so constructed that no resin will ingress into the hole 21 of the anode terminal member 12 and the hole 22 of the cathode terminal member 13. Although these holes 21, 22 are closed with the lower surface of the upper mold 52 and the upper surface of the lower mold 51, the molds need not always be so designed, but satisfactory result can be obtained in so far as there is no space communicating with the inside space 53 and the holes 21, 22 during resin molding.

Figure 2B:
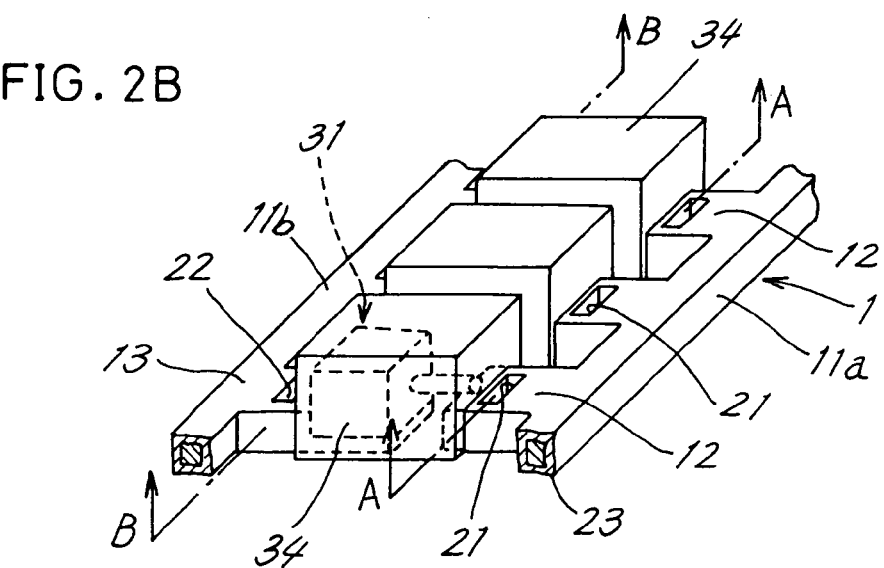

FIG. 2B is a perspective view showing packaging resin portions 34 formed around the respective capacitor elements 31 joined to the fabrication frame 1. The packaging resin portions 34 are generally rectangular parallelpipedal and have opposite side surfaces adjacent to the respective side frames 11a, 11b and positioned inwardly of the respective holes 21, 22. In other words, the packaging resin portions 34 are so formed as to leave the holes 21, 22. After the packing resin portions 34 have been made, the anode terminal members 12 and cathode terminal members 13 are cut respectively along a vertical plane A—A through the holes 21 and a vertical plane B—B through the holes 22, whereby solid electrolytic capacitors 3 are separated from the fabrication frame 1.

Figure 2C:
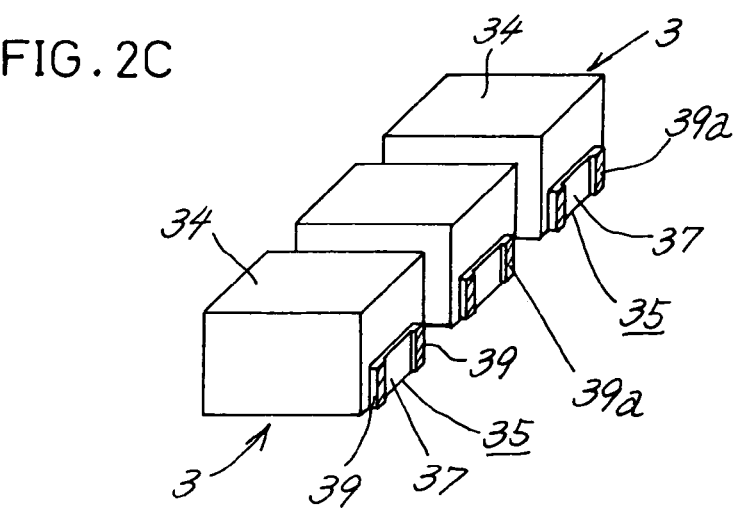
Figure 4:
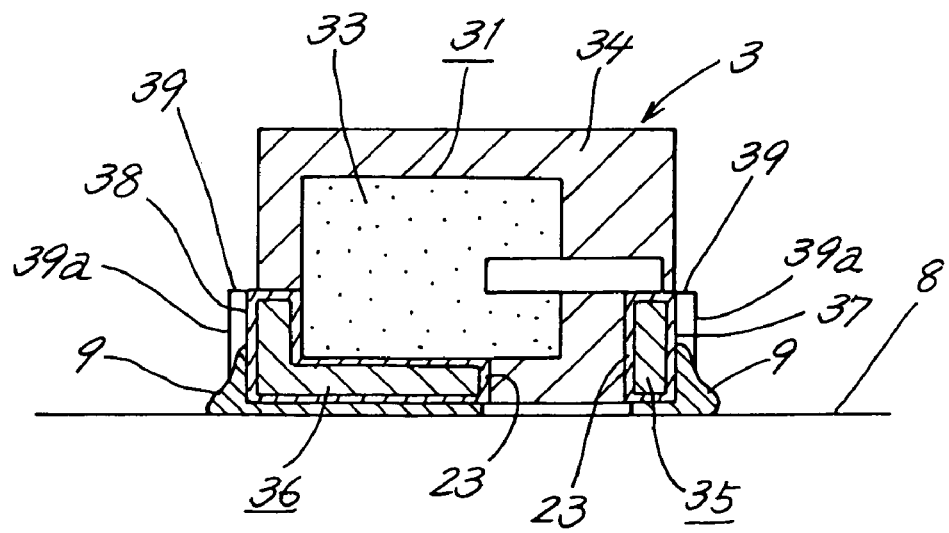
FIG. 4 is a view in vertical section and showing a solid electrolytic capacitor of the chip type fabricated according to the first embodiment and mounted on a board.

FIG. 2C is a perspective view showing the solid electrolytic capacitors 3 obtained. FIG. 4 is a view in vertical section and showing the solid electrolytic capacitor 3 as mounted on a board 8. An anode terminal 35, which is rectangular parallelepipedal in vertical section, is joined to the underside of the anode lead 32 of the capacitor element 31. A cathode terminal 36, which is L-shaped in vertical section, is joined to the bottom surface and side surface of the sintered block 33. The anode terminal 35 is provided by an inner end portion of the anode terminal member 12 including part of the inner surface thereof defining the hole 21. The cathode terminal 36 is provided by an inner end portion of the cathode terminal member 13 including part of the inner surface thereof defining the hole 22. The packaging resin portion 34 is so formed as to cover the capacitor element 31, and the solid electrolytic capacitor 3 is generally rectangular parallelepipedal in its entirety. The bottom surface of the capacitor 3 is a mount surface to be positioned on the board 8 when the capacitor is mounted thereon, and the bottom surfaces of the anode terminal 35 and the cathode terminal 36 are exposed from the packaging resin portion 34. One side surface of the capacitor 3 perpendicular to the mount surface includes a side portion of the anode terminal 35 which portion is exposed from the resin portion 34. The side surface opposite to this side surface includes a side portion of the cathode terminal 36 which portion is exposed from the resin portion 34.

These side portions of the anode terminal 35 and the cathode terminal 36 have respective recesses 37, 38 which are opened upward and downward. Each of these recesses 37, 38 is defined by a planar portion and ridges 39, 39 formed at opposite sides of the planar portion. Except for the ridge end faces 39a which are cut faces formed by separating off the capacitor 3, the anode terminal 35 and the cathode terminal 36 are covered with the plating layer 23. (Incidentally, the ridge end face 39a is rimmed with the plating layer 23.) The capacitor 3 is joined to the board 8 with solder 9.

The solder is provided in the form of a layer between the board 8 and the bottom of the anode terminal 35 and the bottom of the cathode terminal 36 and is applied in the form of a heap to side portions of the capacitor 3. Heaps of solder 9 are joined to the planar portions of the recesses 37, 38. Since these planar portions are covered with the plating layer 23, the solder 9 is joined to the planar portions 37, 38 with a high strength. The ridges 39, 39 formed at opposite sides of the planar portion restrain the flow of molten solder during soldering, preventing the solder 9 from flowing onto the packaging resin portion 34.

Figure 5A:
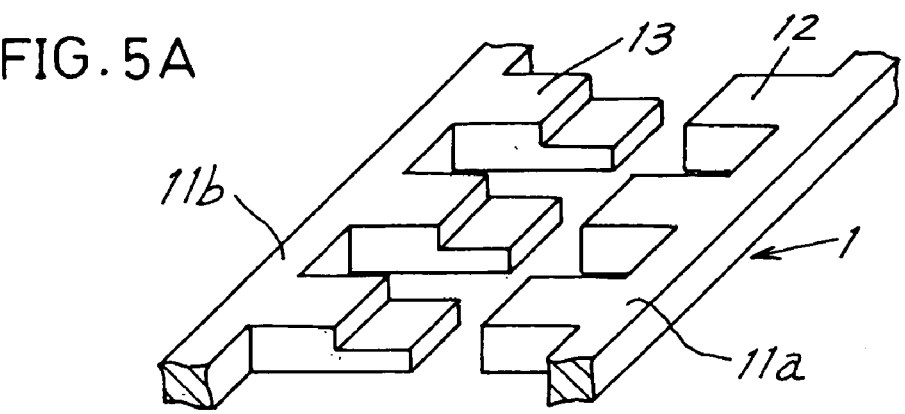
FIGS. 5A to 5C are perspective views showing steps of a second embodiment of the invention.
Figure 5B:
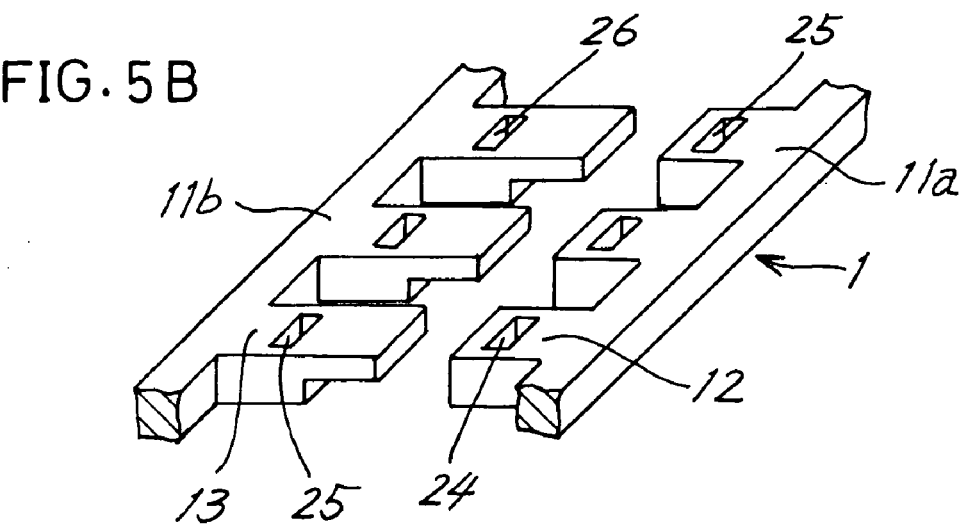
Figure 5C:
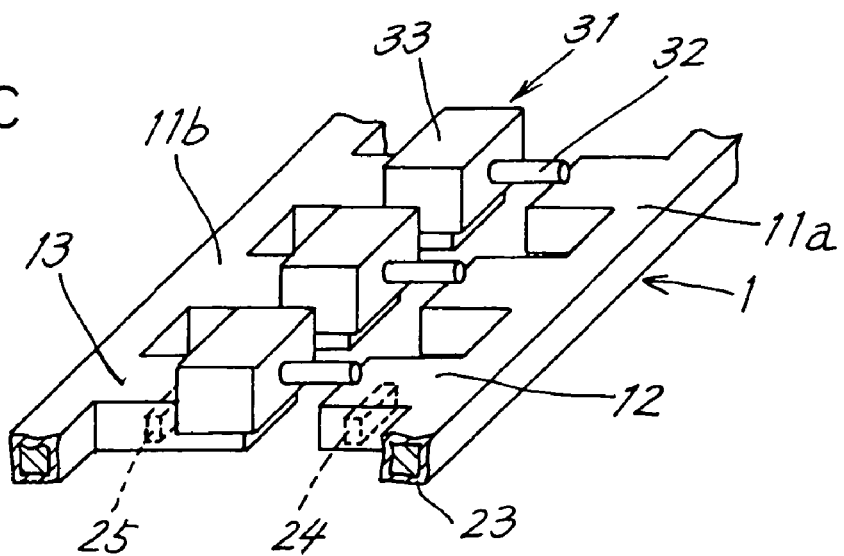

Next, a second embodiment of the invention will be described. With reference to FIG. 5A, the same fabrication frame 1 as in the first embodiment is made from a thin metal plate by cutting, and further by press work or etching. However, the frame 1 of the second embodiment has rectangular parallelepipedal cavities 24, 25 formed in the respective bottom surfaces of anode terminal members 12 and cathode terminal members 13 instead of the holes 21, 22 of the first embodiment. The cavities 24, 25 are formed, for example, by etching. FIG. 5B is a perspective view showing the fabrication frame 1 as turned upside down. After the cavities 24, 25 are formed in the fabrication frame 1, the frame 1 is plated to form a plating layer 23. The plating layer 23 is formed on the inner surfaces of the members 12, 13 defining the cavities 24, 25. Capacitor elements 31 are joined to the fabrication frame 1 as shown in FIG. 5C. The plating layer 31 to be formed on the frame 1 is formed on the anode terminal member 12 and the cathode terminal member 13 in regions at least inwardly of the respective vertical planes C—C and D—D to be mentioned later.

Figure 6A:
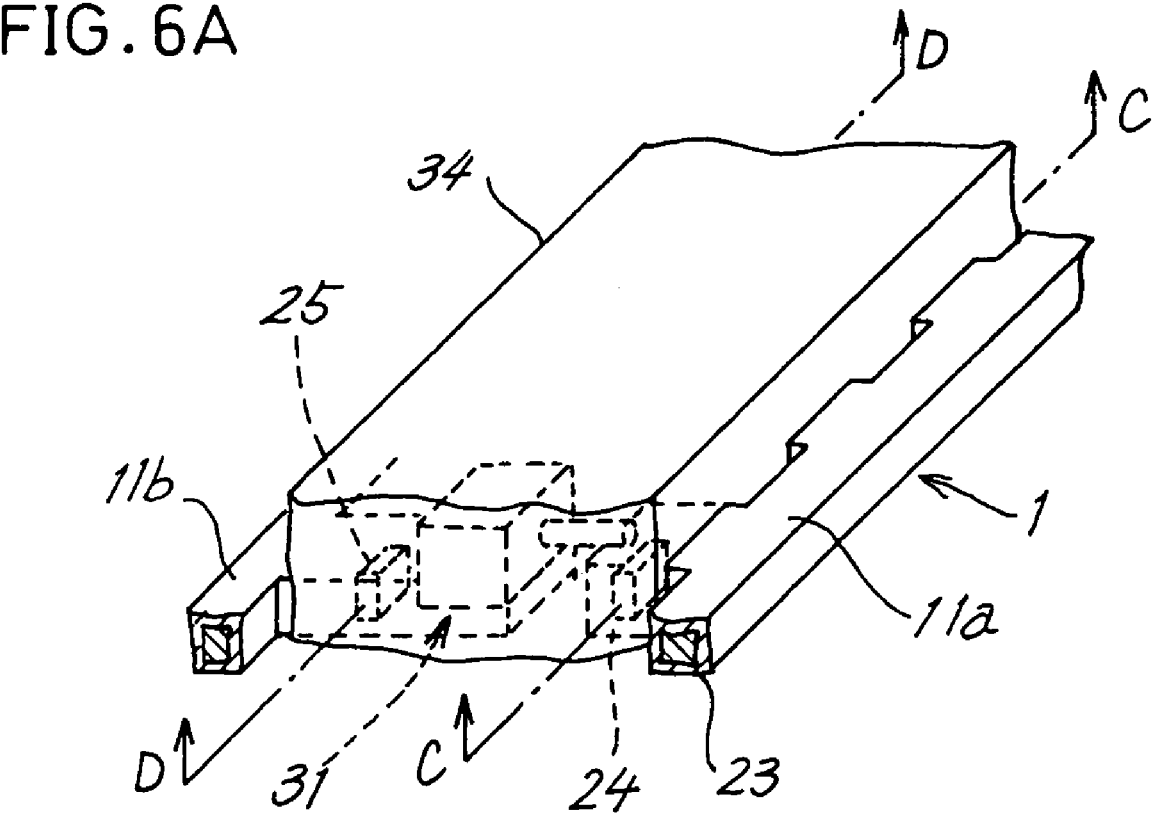
FIGS. 6A and 6B are perspective views showing steps of the second embodiment of the invention.

A packaging resin portion 34 is then formed by resin molding to cover the capacitor elements 31 as shown in FIG. 6A. Although packaging resin portions 34 are formed for the respective capacitor elements 31 individually according to the first embodiment, the resin portion 34 formed according to the second embodiment covers all the capacitor elements 31. Of course, individual packaging resin portions 34 may be formed for the respective capacitor elements 31 also in the case of the second embodiment.

Figure 7:
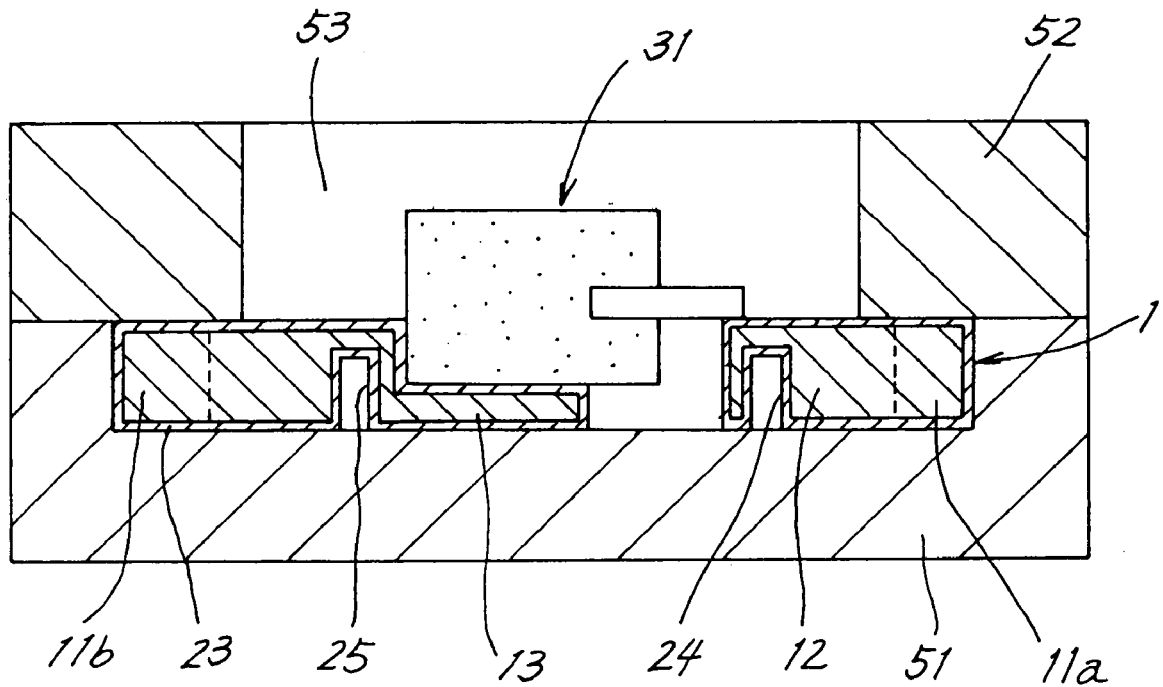
FIG. 7 is a view in vertical section of a capacitor element and members therearound for illustrating how to make a packaging resin portion according to the second embodiment.

FIG. 7 is a sectional view showing how to make the packaging resin portion 34. The fabrication frame 1 having the capacitor elements 31 joined thereto is placed into a lower mold 51, and an upper mold 52 in the form of a frame is placed on the lower mold 51. The upper mold 52 is so positioned as to surround all the capacitor elements 31. These molds 51, 52 define an inside space 53 around the capacitor elements 31 which space is open upward. The packaging resin portion 34 is formed around the elements 31 by pouring epoxy resin into the inside space 53 from above.

Figure 6B:
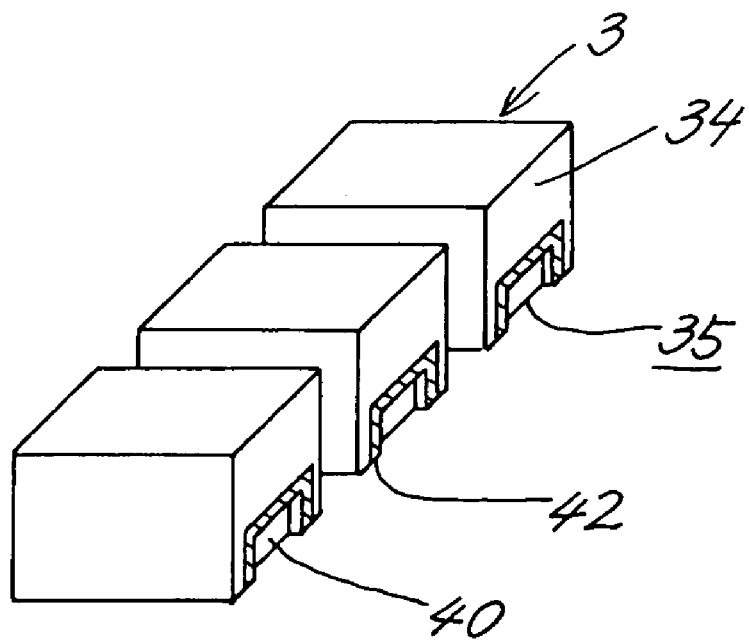

After the packaging resin portion 34 has been formed as shown in FIG. 6A, the anode terminal members 12 and the cathode terminal members 13 are cut respectively along a vertical plane C—C through the cavities 24 and a vertical plane D—D through the cavities 25. Since the resin portion 34 is provided above the cavities 24, 25 over the terminal members 12, 13 according to the present embodiment, the resin portion 34 is also partly cut away at this time. The resin portion 34 is thereafter cut along vertical planes between the capacitor elements 31, whereby solid electrolytic capacitors 3 are completed as shown in FIG. 6B.

Figure 8:
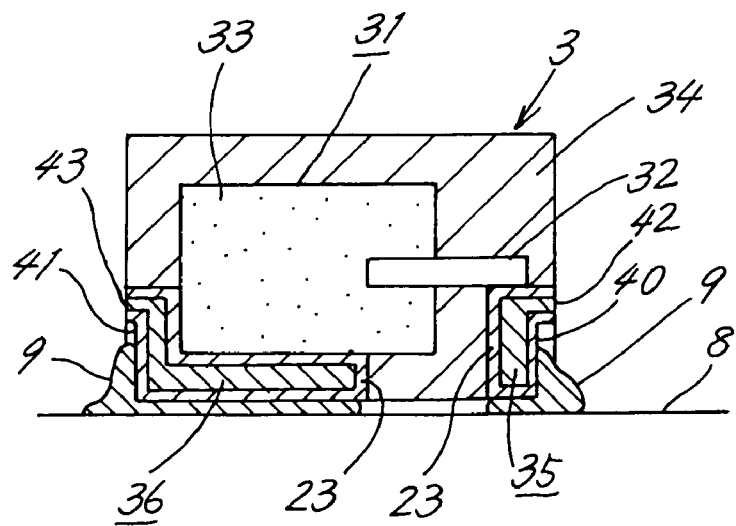
FIG. 8 is a view in vertical section and showing a solid electrolytic capacitor of the chip type fabricated according to the second embodiment and mounted on a board.
Figure 9A:
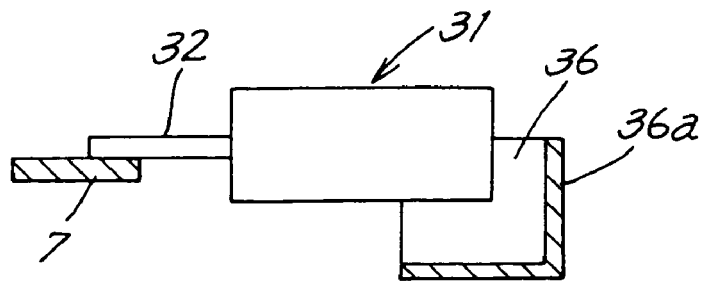
FIGS. 9A to 9D are side elevations showing a process for fabricating a conventional chip-type solid electrolytic capacitor.
Figure 9B:
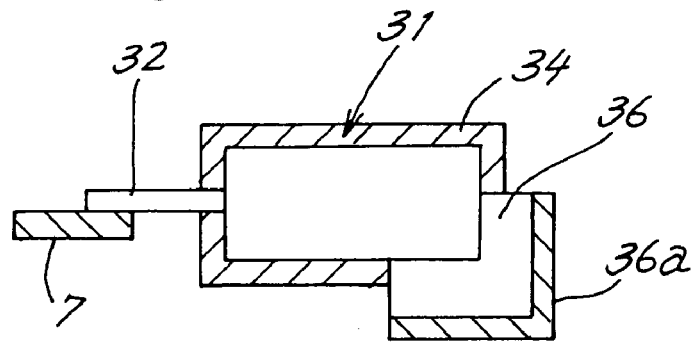
Figure 9C:
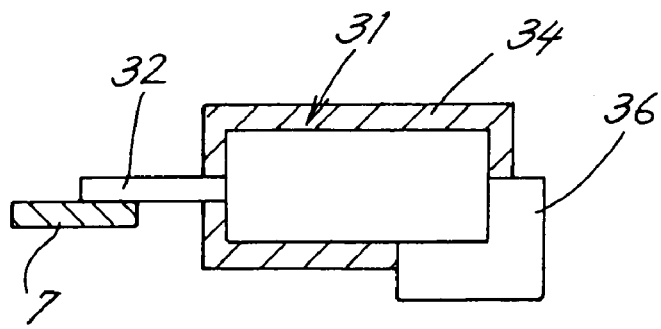
Figure 9D:
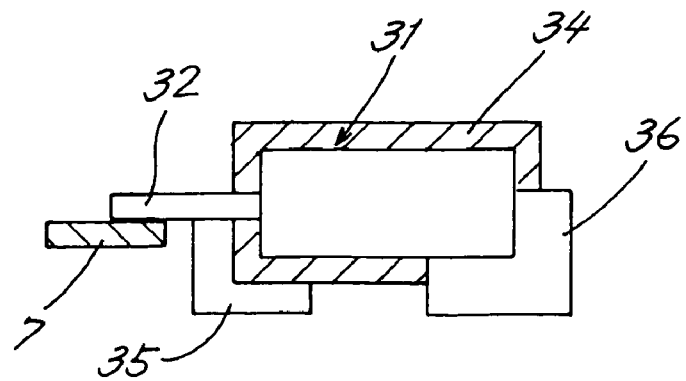
Figure 10A:
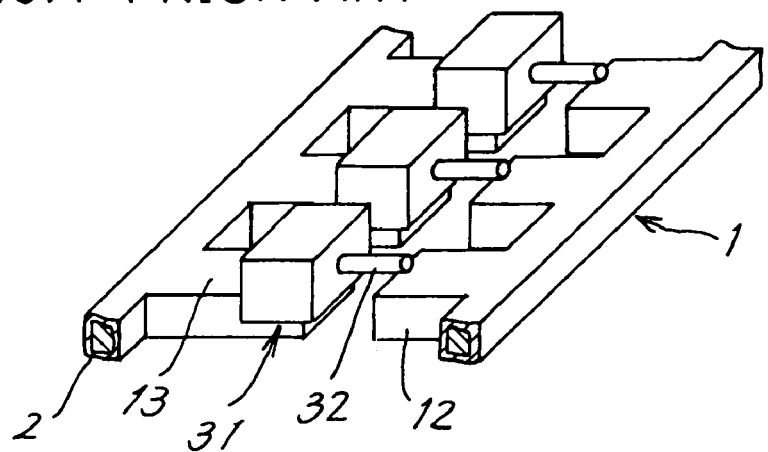
FIGS. 10A to 10C are perspective views showing another process for fabricating a conventional chip-type solid electrolytic capacitor.
Figure 10B:
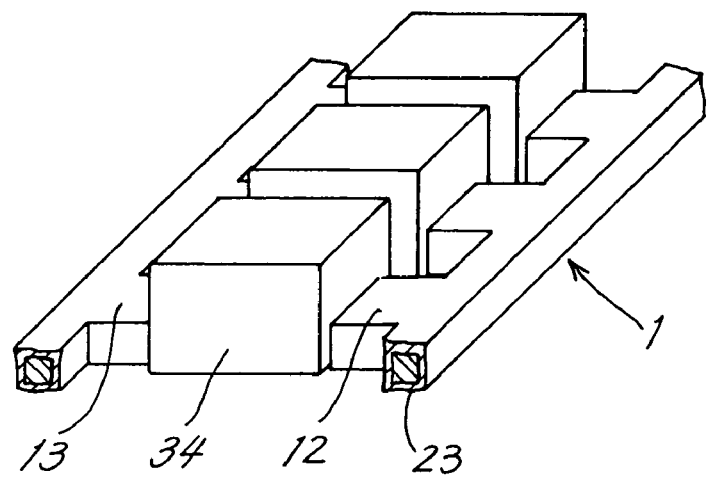
Figure 10C:
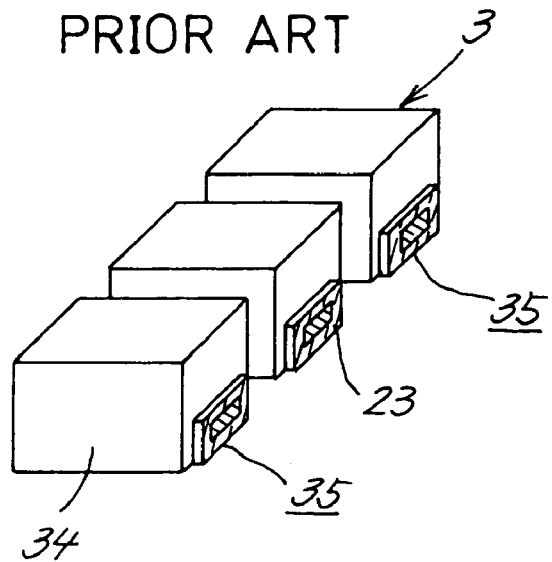

FIG. 8 is a view in vertical section and showing the solid electrolytic capacitor 3 fabricated according to the present embodiment and mounted on a board 8. The capacitor 3 produced according to the second embodiment is the same as the capacitor fabricated according to the first embodiment except for side surfaces of the anode terminal 35 and the cathode terminal 36. Recesses 40, 41 which are open downward are formed in the respective side surfaces of the anode terminal 35 and the cathode terminal 36. These recesses are formed by cutting the cavity portions 24, 25. The inner surfaces of the terminal members defining the cavities 24, 25 are provided with the plating layer 23. The surfaces defining the respective recesses are also provided with the plating layer 23. Accordingly, when the solid electrolytic capacitor 3 is joined to the board 8 using solder 9, heaps of solder 9 formed on side portions of the capacitor 3 are joined to the bottom surfaces of the recesses 40, 41 in the anode terminal 35 and the cathode terminal 36 with a high strength. Furthermore, the recesses 40, 41 serve to restrain the flow of molten solder 9 during soldering, preventing the solder 9 from flowing onto the resin portion 34. Ridge end faces 42, 43 surrounding the recesses 40, 41 are cut faces of the anode terminal member 12 and the cathode terminal member 13 and are not covered with the plating layer 23. (Incidentally, the end faces 42, 43 are rimmed with the plating layer 23.)

According to the first embodiment, the holes 21, 22 are rectangular holes, whereas if the heaps of solder 9 are in contact with the anode terminal 35 and the cathode terminal 36 of the solid electrolytic capacitor fabricated over sufficient areas in practicing the present invention, the shape of the holes 21, 22 is not limited specifically. The same is true of the cavities 24, 25 of the second embodiment.

The embodiments described above are intended to illustrate the present invention and should not be construed as limiting the invention set forth in the appended claims or reducing the scope thereof. The process and the device of the invention are not limited to the foregoing embodiment but can of course be modified variously within the technical scope of the claims.

What is claimed is:

1. A solid electrolytic capacitor comprising a capacitor element, an anode terminal joined to the capacitor element, a cathode terminal joined to the capacitor element and a packaging resin portion covering the capacitor element, the anode terminal being exposed from the packaging resin portion at a bottom surface of the solid electrolytic capacitor and a side surface thereof continuous with the bottom surface, a side portion of the anode terminal exposed from the side surface being provided with a recess opened downward, a surface of the recess being covered with a plating layer.

2. A solid electrolytic capacitor according to claim 1 wherein the recess is also opened upward.

3. A solid electrolytic capacitor according to claim 1 wherein material making up the anode terminal is exposed around the recess.

4. A solid electrolytic capacitor according to claim 1 wherein a bottom portion of the anode terminal exposed from the bottom surface of the solid electrolytic capacitor is covered with a plating layer.

5. A solid electrolytic capacitor comprising a capacitor element, an anode terminal joined to the capacitor element, a cathode terminal joined to the capacitor element and a packaging resin portion covering the capacitor element, the cathode terminal being exposed from the packaging resin portion at a bottom surface of the solid electrolytic capacitor and a side surface thereof continuous with the bottom surface, a side portion of the cathode terminal exposed from the side surface being provided with a recess opened downward, a surface of the recess being covered with a plating layer.

6. A solid electrolytic capacitor according to claim 5 wherein the recess is also opened upward.

7. A solid electrolytic capacitor according to claim 5 wherein material making up the cathode terminal is exposed around the recess.

8. A solid electrolytic capacitor according to claim 5 wherein a bottom portion of the cathode terminal exposed from the bottom surface of the solid electrolytic capacitor is covered with a plating layer.

9. A solid electrolytic capacitor comprising a capacitor element, an anode terminal joined to the capacitor element, a cathode terminal joined to the capacitor element and a packaging resin portion covering the capacitor element, the anode terminal being exposed from the packaging resin portion at a bottom surface of the solid electrolytic capacitor and a first side surface thereof continuous with the bottom surface, the cathode terminal being exposed from the packaging resin portion at the bottom surface and a second side surface continuous with the bottom surface, a side portion of the anode terminal exposed from the first side surface being provided with a first recess opened downward, a side portion of the cathode terminal exposed from the second side surface being provided with a second recess opened downward, a surface of each of the first and second recesses being covered with a plating layer.

10. A solid electrolytic capacitor according to claim 9 wherein the first and second recesses are also opened upward.

11. A solid electrolytic capacitor according to claim 9 wherein material making up the anode terminal is exposed around the first recess and material making up the cathode terminal is exposed around the second recess.

12. A solid electrolytic capacitor according to claim 9 wherein a bottom portion of each of the anode and cathode terminals exposed from the bottom surface is covered with a plating layer.

13. A solid electrolytic capacitor according to claim 9 wherein the first side surface and the second side surface are opposed to each other.

14. A solid electrolytic capacitor according to claim 13 wherein the first and second recesses are also opened upward.

15. A solid electrolytic capacitor according to claim 13 wherein material making up the anode terminal is exposed around the first recess and material making up the cathode terminal is exposed around the second recess.

16. A solid electrolytic capacitor according to claim 13 wherein a bottom portion of each of the anode and cathode terminals exposed from the bottom surface of the solid electrolytic capacitor is covered with a plating layer.

* * * * *